United States Patent
Yokosuka et al.

(10) Patent No.: US 10,921,894 B2
(45) Date of Patent: Feb. 16, 2021

(54) USER INTERFACE DEVICE

(71) Applicant: MITSUBISHI ELECTRIC CORPORATION, Tokyo (JP)

(72) Inventors: Yusuke Yokosuka, Tokyo (JP); Futoshi Ohama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/497,749

(22) PCT Filed: Apr. 10, 2017

(86) PCT No.: PCT/JP2017/014671
§ 371 (c)(1),
(2) Date: Sep. 25, 2019

(87) PCT Pub. No.: WO2018/189784
PCT Pub. Date: Oct. 18, 2018

(65) Prior Publication Data
US 2020/0026358 A1    Jan. 23, 2020

(51) Int. Cl.
*G06F 3/0482* (2013.01)
*G06F 3/01* (2006.01)

(52) U.S. Cl.
CPC ............ *G06F 3/016* (2013.01); *G06F 3/0482* (2013.01)

(58) Field of Classification Search
CPC ................................ G06F 3/016; G06F 3/0482
See application file for complete search history.

(56) References Cited

U.S. PATENT DOCUMENTS

| 9,024,747 | B1* | 5/2015 | Faaborg ............ G08B 5/22 340/527 |
| 2003/0058216 | A1* | 3/2003 | Lacroix ............ G06F 3/016 345/156 |
| 2008/0287147 | A1 | 11/2008 | Grant et al. |
| 2014/0267069 | A1 | 9/2014 | Dionne et al. |
| 2016/0018891 | A1 | 1/2016 | Levesque et al. |

(Continued)

FOREIGN PATENT DOCUMENTS

| JP | 2014-209325 A | 11/2014 |
| JP | 2015-84570 A | 4/2015 |

(Continued)

OTHER PUBLICATIONS

International Search Report for PCT/JP2017/014671 dated Jun. 20, 2017.

(Continued)

*Primary Examiner* — Andrew T Chiusano
(74) *Attorney, Agent, or Firm* — Birch, Stewart, Kolasch & Birch, LLP.

(57) ABSTRACT

An event managing unit (8) is provided, which, when an event detected by the event detecting unit (7) is an event accompanied by notification of haptic feedback, determines whether or not to permit the notification of haptic feedback, on the basis of a reason for the notification of haptic feedback as a result of the event detected by the event detecting unit (7), and when a determination result from the event managing unit (8) indicates permission of the notification, a feedback notifying unit (11) provides the notification of haptic feedback.

3 Claims, 5 Drawing Sheets

(56) References Cited

U.S. PATENT DOCUMENTS

| | | | |
|---|---|---|---|
| 2016/0062464 A1* | 3/2016 | Moussette | G06F 3/0416 |
| | | | 345/173 |
| 2016/0070447 A1* | 3/2016 | Righter | G06F 3/04842 |
| | | | 386/241 |
| 2016/0367892 A1 | 12/2016 | Otani et al. | |
| 2019/0033970 A1* | 1/2019 | Mellor | G06F 3/04886 |

FOREIGN PATENT DOCUMENTS

| | | |
|---|---|---|
| JP | 2015-167758 A | 9/2015 |
| JP | 2016-24826 A | 2/2016 |

OTHER PUBLICATIONS

Office Action for Japanese Patent Application No. 2017-560630 dated Jan. 9, 2018.

* cited by examiner

USER INTERFACE DEVICE

TECHNICAL FIELD

The present invention relates to a user interface device that provides notification of haptic feedback.

BACKGROUND ART

In recent years, user interface devices that detect, as an event, an operation on a screen on which GUI components that are graphical user interfaces are displayed when the operation is performed on the screen, and provide notification of haptic feedback when the detected event is an event accompanied by the notification of haptic feedback have been developed.

Notification of haptic feedback is achieved by a device embedded in a touch panel or the like providing vibration or the like to a finger, etc. of a user touching the touch panel, for example.

Patent Literature 1 mentioned below teaches a user interface device having functions enabling the user to set priority of various events accompanied by notification of haptic feedback.

According to the user interface device, when the priority of an event A is set to be higher than that of an event B, and the event A and the event B are detected at the same time, for example, notification of haptic feedback as a result of the event A is provided but notification of haptic feedback as a result of the event B is not provided.

As a result, when a plurality of events are detected at the same time, only notification of haptic feedback as a result of an event with the highest priority can be provided, which can reduce unnecessary notification.

CITATION LIST

Patent Literature

Patent Literature 1: JP 2016-024826 A

SUMMARY OF INVENTION

Technical Problem

According to the user interface device of the related art, which is configured as described above, the user sets priority of various events accompanied by notification of haptic feedback in advance, and this enables only notification of haptic feedback as a result of an event with the highest priority when a plurality of events are detected at the same time. This requires, however, setting of priority each time arrangement of GUI components on the screen is determined, and there is a problem that the load on the user for the priority setting is greater as the number of GUI components to be arranged is larger.

The present invention has been made to solve such problems as described above, and an object thereof is to provide a user interface device capable of reducing unnecessary notification and preventing notification of haptic feedback that may cause a user to feel something is wrong, without setting priority in advance by the user.

Solution to Problem

A user interface device according to the present invention includes: an operation receiving processing circuitry to receive an operation on a screen on which a GUI component being a graphical user interfaces is displayed; a processor to execute a program; a memory to store the program which, when executed by the processor, performs processes of, detecting, as an event, the operation received by the operation receiving unitprocessing circuitry, while propagating the operation from a current GUI component to be operated toward a parent GUI component on a basis of a tree structure of the GUI components; and when the event detected is an event accompanied by notification of haptic feedback stimulating tactile sense of a user, determining whether or not to permit the notification of haptic feedback, on the basis of a reason for the notification of haptic feedback as a result of the event detected; and a feedback notifying processing circuitry to provide the notification of haptic feedback when a determination result indicates permission of the notification, wherein the processes further include, for one operation received by the operation receiving processing circuitry, each time an event is successively detected from the GUI component to be operated toward the parent GUI component in the tree structure of the GUI components, determining whether or not the detected event is an event accompanied by notification of haptic feedback, and storing the detected event in a first-in first-out queue when the detected event is the event accompanied by notification of haptic feedback, and under a condition where two or more events are stored in the queue, determining whether or not to permit notification of haptic feedback on a basis of reasons for notification of haptic feedback as a result of the respective events, and determining notification of haptic feedback to be finally provided.

Advantageous Effects of Invention

According to the present invention, the event managing unit is provided, which, when the event detected by the event detecting unit is an event accompanied by notification of haptic feedback, determines whether or not to permit the notification of haptic feedback, on the basis of the reason for the notification of haptic feedback as a result of the event detected by the event detecting unit, and the feedback notifying unit provides the notification of haptic feedback when the determination result from the event managing unit indicates permission of the notification, thereby producing effects of reducing unnecessary notification and preventing notification of haptic feedback that may cause the user to feel something is wrong, without setting priority in advance by the user.

BRIEF DESCRIPTION OF DRAWINGS

FIG. 3 is a hardware configuration diagram of a computer in a case where a computing device 6 in the user interface device is implemented by software, firmware, or the like.

FIG. 4 is a flowchart illustrating procedures in the case where the computing device 6 in the user interface device is implemented by software, firmware or the like.

FIG. 5 is a flowchart illustrating procedures in the case where the computing device 6 in the user interface device is implemented by software, firmware or the like.

DESCRIPTION OF EMBODIMENTS

Embodiments for carrying out the invention will now be described with reference to the accompanying drawings for more detailed explanation of the invention.

First Embodiment

Figure 1:
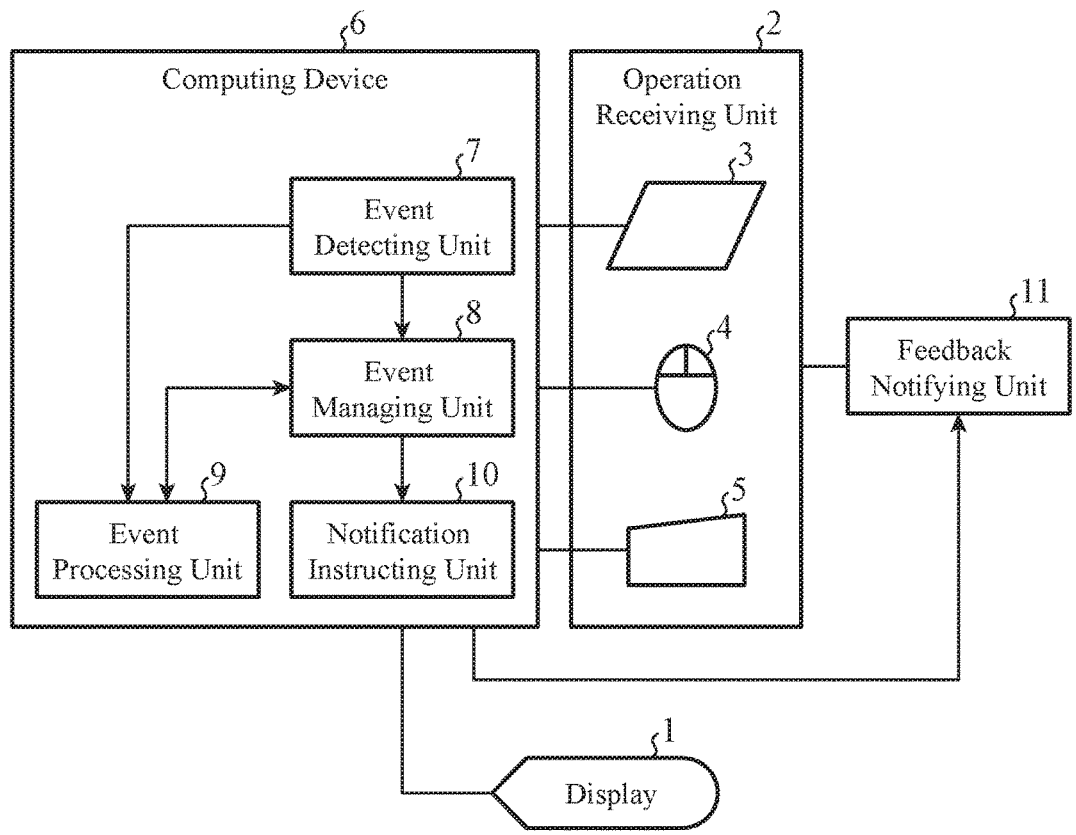
FIG. 1 is a configuration diagram illustrating a user interface device according to a first embodiment of the present invention.
Figure 2:
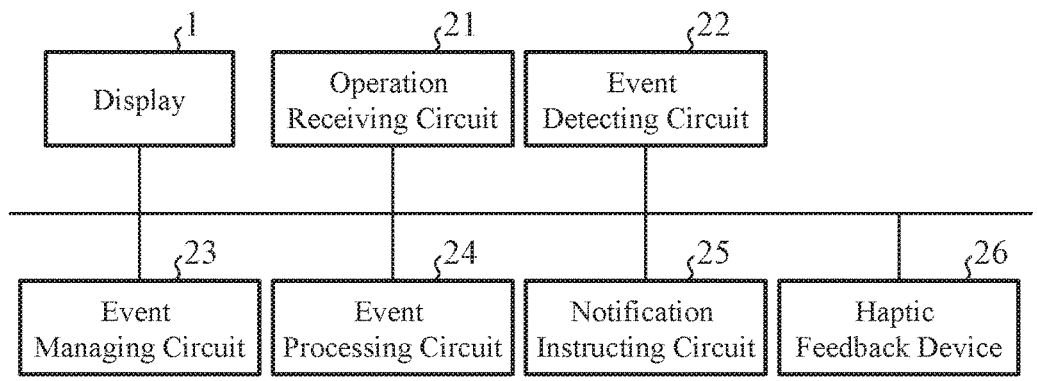
FIG. 2 is a hardware configuration diagram illustrating a user interface device according to the first embodiment of the present invention.

FIG. 1 is a configuration diagram illustrating a user interface device according to a first embodiment of the present invention, and FIG. 2 is a hardware configuration diagram illustrating the user interface device according to the first embodiment of the present invention.

In FIGS. 1 and 2, GUI components, which are graphical user interfaces, are displayed on a display 1.

An operation receiving unit 2 is implemented by an operation receiving circuit 21 illustrated in FIG. 2, for example, and includes a touch panel 3, a mouse 4, a keyboard 5, and the like.

The operation receiving unit 2 performs a process of receiving an operation on a screen of the display 1 on which GUI components are displayed.

A computing device 6 includes an event detecting unit 7, an event managing unit 8, an event processing unit 9, and a notification instructing unit 10, and performs various processes.

The event detecting unit 7 of the computing device 6 is implemented by an event detecting circuit 22 illustrated in FIG. 2, for example.

The event detecting unit 7 performs a process of detecting, as an event, an operation received by the touch panel 3, the mouse 4, or the keyboard 5 in the operation receiving unit 2.

The event managing unit 8 of the computing device 6 is implemented by an event managing circuit 23 illustrated in FIG. 2, for example.

The event managing unit 8 performs a process of determining whether or not the event detected by the event detecting unit 7 is an event accompanied by notification of haptic feedback that stimulates the tactile sense of a user.

When the event is determined to be accompanied by notification of haptic feedback, the event managing unit 8 performs a process of managing the event detected by the event detecting unit 7.

The event managing unit 8 performs a process of determining, on the basis of a reason for the notification of haptic feedback by the event being managed, whether or not to permit notification of haptic feedback by the event being managed.

The event processing unit 9 of the computing device 6 is implemented by an event processing circuit 24 illustrated in FIG. 2, for example.

The event processing unit 9 is a processing unit that causes GUI components to perform processing of the event detected by the event detecting unit 7.

The notification instructing unit 10 of the computing device 6 is implemented by a notification instructing circuit 25 illustrated in FIG. 2, for example.

When the notification is permitted by the event managing unit 8, the notification instructing unit 10 performs a process of instructing a feedback notifying unit 11 to provide the notification of haptic feedback.

The feedback notifying unit 11 is implemented by a haptic feedback device 26 illustrated in FIG. 2, for example.

While the feedback notifying unit 11 is illustrated as being connected with the operation receiving unit 2 in FIG. 1, it is assumed that the haptic feedback device 26 is incorporated in each of the touch panel 3, the mouse 4, and the keyboard 5 in the first embodiment.

The feedback notifying unit 11 notifies the operation receiving unit 2 of the haptic feedback in accordance with an instruction from the notification instructing unit 10.

In FIG. 1, it is assumed that each of the event detecting unit 7, the event managing unit 8, the event processing unit 9, and the notification instructing unit 10, which are components of the computing device 6 in the user interface device is implemented by dedicated hardware as illustrated in FIG. 2. Specifically, it is assumed that the components are implemented by the event detecting circuit 22, the event managing circuit 23, the event processing circuit 24, and the notification instructing circuit 25.

Note that the event detecting circuit 22, the event managing circuit 23, the event processing circuit 24, and the notification instructing circuit 25 may be a single circuit, a composite circuit, a programmed processor, a parallel-programmed processor, an application specific integrated circuit (ASIC), a field-programmable gate array (FPGA), or a combination thereof, for example.

The components of the computing device 6 in the user interface device are, however, not limited to those implemented by dedicated hardware, and the computing device 6 may be implemented by software, firmware, or combination of software and firmware.

The software or firmware is stored in a memory of a computer in the form of programs. The computer refers to hardware for executing programs, and may be a central processing unit (CPU), a central processing unit, a processing unit, a computing unit, a microprocessor, a microcomputer, a processor, a digital signal processor (DSP) or the like, for example.

Figure 3:
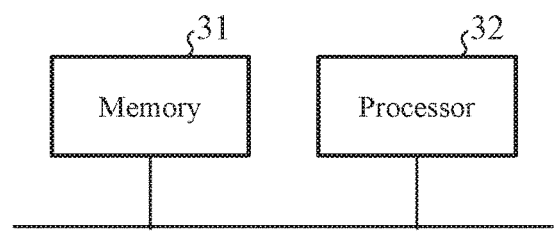

FIG. 3 is a hardware configuration diagram of the computer in a case where the computing device 6 in the user interface device is implemented by software, firmware, or the like.

In the case where the computing device 6 in the user interface device is implemented by software, firmware, or the like, programs for causing the computer to perform procedures of the event detecting unit 7, the event managing unit 8, the event processing unit 9, and the notification instructing unit 10 may be stored in a memory 31, and a processor 32 of the computer may execute the programs stored in the memory 31.

Figure 4:
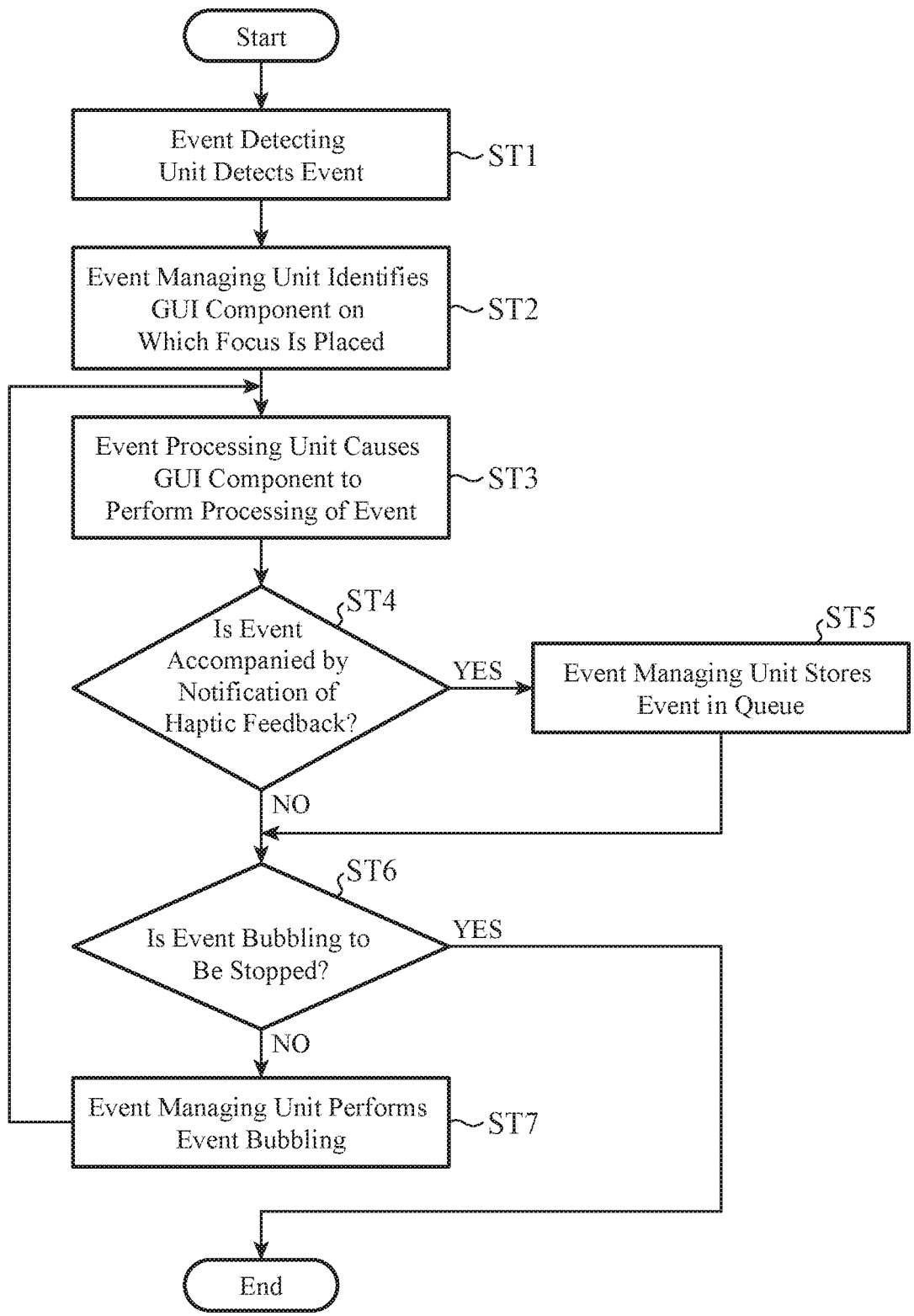
Figure 5:
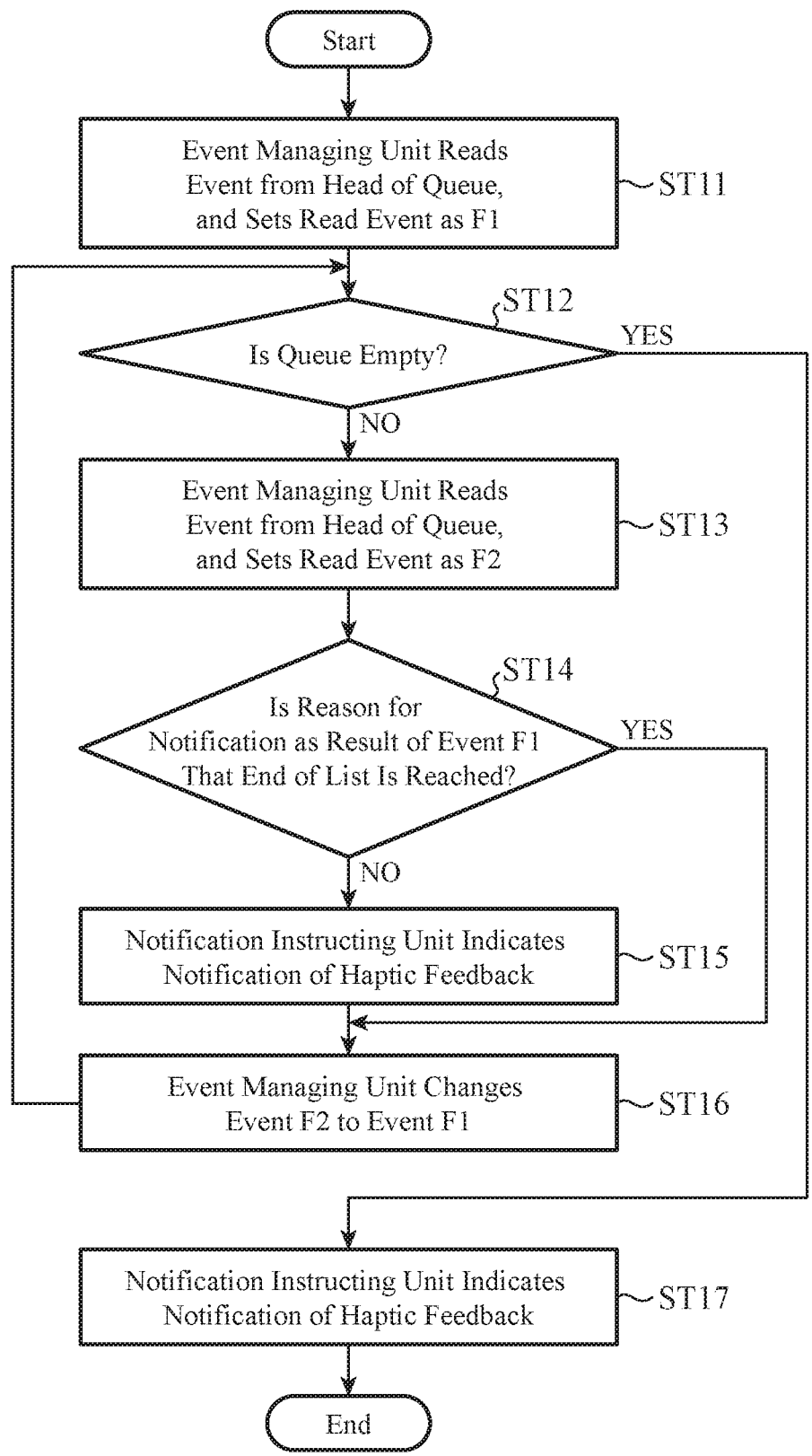

FIGS. 4 and 5 are flowcharts illustrating the procedures in the case where the computing device 6 in the user interface device is implemented by software, firmware, or the like.

While an example in which the components of the computing device 6 in the user interface device are each implemented by dedicated hardware is illustrated in FIG. 2, and an example in which the computing device 6 in the user interface device is implemented by software, firmware, or the like is illustrated in FIG. 3, some components in the computing device 6 may be implemented by dedicated hardware and the others may be implemented by software, firmware, or the like.

Next, operation will be explained.

Figure 6:
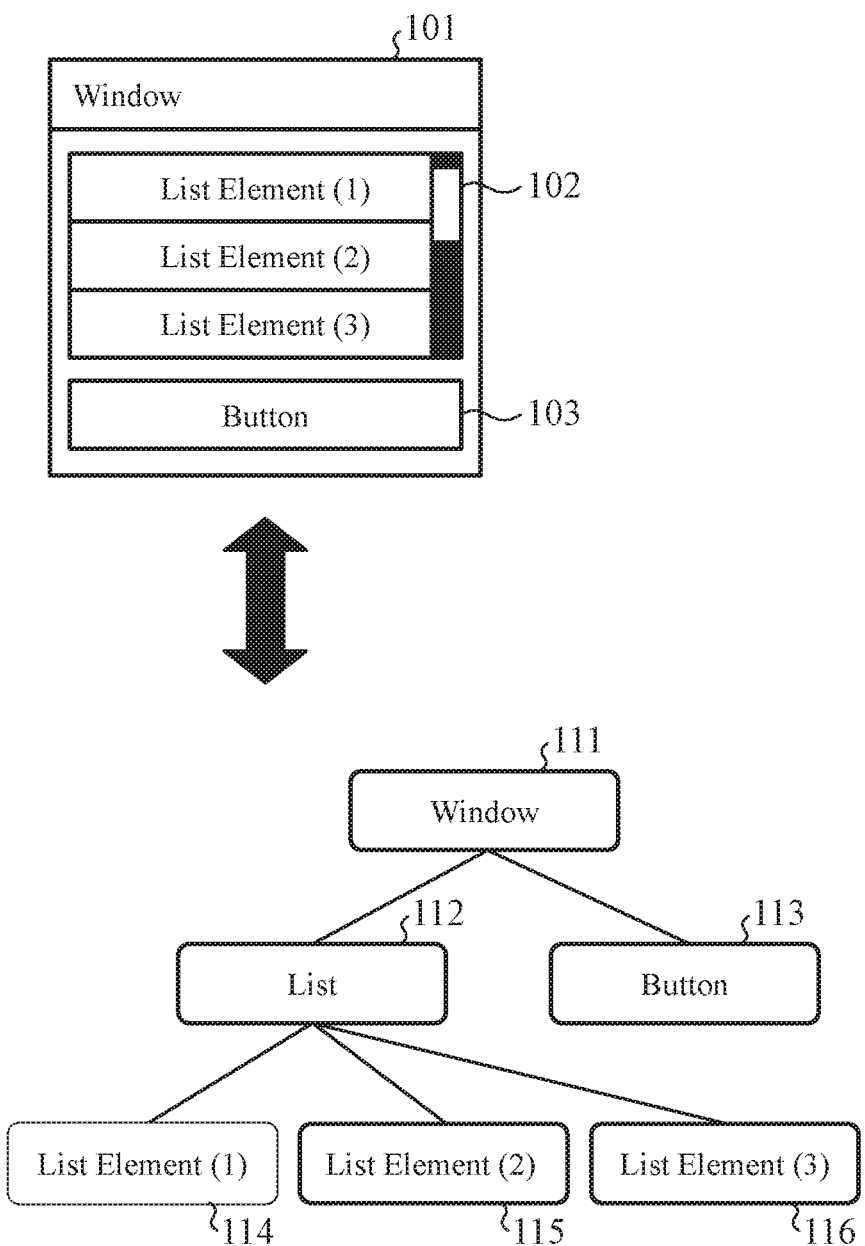
FIG. 6 is an explanatory diagram illustrating an example of GUI components displayed on a screen of a display 1.

FIG. 6 is an explanatory diagram illustrating an example of GUI components displayed on the screen of the display 1.

In FIG. 6, each of a window 101, a list 102, and a button 103 is a GUI component.

The list 102, which is a GUI component, includes, as a plurality of list elements, a list element (1), a list element (2), and a list element (3).

The window 101, the list 102, and the button 103, which are GUI components, are in a hierarchical structure.

Thus, GUI components within the window 101 are expressed by a tree structure of GUI components, in which a node 112 representing the list 102 and a node 113 representing the button 103 are present as child nodes of a node 111 representing the window 101. In addition, a node 114 representing the list element (1), a node 115 representing the list element (2), and a node 116 representing the list element (3) are present immediately under the node 112 representing the list 102.

In the first embodiment, when focus has been placed on the list 102 and an event of moving the focus position to the button 103 is detected, the window 101, which is a GUI component, requests the event managing unit 8 to provide notification of haptic feedback so as to inform the user that the focus position has moved to another GUI component.

In addition, when focus has been placed on the button 103 and an event of moving the focus position to the list 102 is detected, the window 101 requests the event managing unit 8 to provide notification of haptic feedback so as to inform the user that the focus position has moved to another GUI component.

Furthermore, when focus has been placed on the button 103 and an event of moving the focus downward is detected, the window 101 requests the event managing unit 8 to provide notification of haptic feedback so as to inform the user that the focus position reaches a lower end that is an end of the window 101.

When focus has been placed on the list element (3) and an event of moving the focus downward is detected, the list 102, which is a GUI component, requests the event managing unit 8 to provide notification of haptic feedback so as to inform the user that the focus position reaches a lower end that is an end of the list 102.

The event managing unit 8 performs event bubbling of propagating an event detected by the event detecting unit 7 from a node representing a GUI component on which focus is currently placed toward a parent node of the node.

In the tree structure illustrated in FIG. 6, when an event is detected while focus is placed on the list element (1), for example, the event is sequentially propagated as follows: the node 114 representing the list element (1)→the node 112 representing the list 102→the node 111 representing the window 101.

When, however, the processing of an event detected by the event detecting unit 7 has been completed, for example, the event managing unit 8 stops event bubbling.

An example of preferable notification of haptic feedback will now be explained before explanation of detailed processes of the user interface device of FIG. 1.

For example, assume a case where a user presses a down arrow key of the keyboard 5 in the operation receiving unit 2 while focus is placed on the button 103.

In the example of FIG. 6, no GUI component is present downward of the button 103 within the window 101. Thus, when the user presses the down arrow key of the keyboard 5, the focus position reaches the lower end that is an end of the window 101, and cannot be moved to another GUI component.

As a result, a request for notification of haptic feedback is output from the window 101, which is a GUI component, to the event managing unit 8 so as to inform the user that the focus position has reached the end of the window 101.

When the notification of haptic feedback is provided in accordance with the request, the user can recognize that the focus position cannot be moved downward of the button 103, and the notification of haptic feedback is considered as being effective notification.

Next, assume a case where the user presses the down arrow key of the keyboard 5 in the operation receiving unit 2, for example, while focus is placed on the list element (3), for example.

In the example of FIG. 6, the button 103 is located downward of the list element (3) within the window 101, and when the user presses the down arrow key of the keyboard 5, the focus position can be moved to the button 103.

Thus, when the user presses the down arrow key of the keyboard 5 while focus is placed on the list element (3), the focus position moves to a different GUI component. Specifically, the focus position moves from the list element (3) of the list 102 to the button 103.

Thus, a request for notification of haptic feedback is output from the window 101, which is a GUI component, to the event managing unit 8 so as to inform the user that the focus position has moved to a different GUI component. Hereinafter, this request for notification of haptic feedback will be referred to as a notification request R1.

In addition, when the focus position moves from the list element (3) of the list 102 to the button 103, the focus position reaches the lower end that is the end of the list 102, and a request for notification of haptic feedback is therefore output from the list 102, which is a GUI component, to the event managing unit 8. Hereinafter, this request for notification of haptic feedback will be referred to as a notification request R2.

When notifications of haptic feedback are provided in accordance with both of the notification request R1 and the notification request R2, two notifications of haptic feedback accompanying one event may cause the user to feel something is wrong.

In addition, because the focus position can be moved even when the focus position has reached the end of the list 102, the notification of haptic feedback in response to the notification request R2 is considered as being unnecessary notification.

Thus, it is considered desirable to provide only notification of haptic feedback in response to the notification request R1 and prevent providing notification of haptic feedback in response to the notification request R2.

In the first embodiment, the user interface device capable of providing only notification of haptic feedback in response to a notification request R1 and preventing providing notification of haptic feedback in response to a notification request R2 without setting priority of notification requests R1 and R2, for example, will be described below.

When the GUI components are displayed on the screen of the display 1 as illustrated in FIG. 6, for example, the operation receiving unit 2 performs a process of receiving an operation on the screen of the display 1.

For convenience of explanation, assume here that the user has made an operation of moving the focus position downward from the position of the list element (3) in the list 102 to the position of the lower end of the window 101 by using the touch panel 3, the mouse 4, or the keyboard 5 in the operation receiving unit 2.

The event detecting unit 7 of the computing device 6 detects the operation received by the operation receiving unit 2 as an event E (step ST1 in FIG. 4).

Because the operation received by the operation receiving unit 2 is the operation of moving the focus position downward from the position of the list element (3) in the list 102 to the position of the lower end of the window 101, the event E detected by the event detecting unit 7 includes the following events E1 and E2:

event E1
→an event of moving the focus position from the list element (3) to the button 103;
event E2
→an event of moving the focus position from the button 103 to the lower end of the window 101.

While an example in which the event E detected by the event detecting unit 7 includes the event E1 and the event E2 is presented in the first embodiment, it is not limited thereto, and the event detecting unit 7 may detect the event E1 and the event E2 individually. Specifically, the event detecting unit 7 may detect the event E1, and then detect the event E2.

The event managing unit 8 of the computing device 6 holds the current focus position that is a focus position before an event is detected by the event detecting unit 7.

The event managing unit 8 identifies a GUI component on which focus is currently placed (step ST2 in FIG. 4), and informs the event processing unit 9 of the identified GUI component.

In the first embodiment, because the current focus position is on the list element (3), the list 102 is identified as the GUI component on which focus is currently placed.

Upon receiving the information on the GUI component on which focus is placed from the event managing unit 8, the event processing unit 9 causes the GUI component to perform processing of the event E detected by the event detecting unit 7.

In the first embodiment, the list 102 is identified as the GUI component on which focus is placed, and the event processing unit 9 thus causes the list 102 to perform processing of the event E1 included in the event E detected by the event detecting unit 7 (step ST3 in FIG. 4).

Because the focus position reaches the lower end that is the end of the list 102 as a result of the processing of the event E1, the list 102 outputs a notification request R2 for haptic feedback to the event managing unit 8 via the event processing unit 9.

On the basis of the presence or absence of a request for notification of haptic feedback from the GUI component, the event managing unit 8 determines whether or not the event E1 included in the event E detected by the event detecting unit 7 is an event accompanied by notification of haptic feedback (step ST4 in FIG. 4).

In the first embodiment, because the notification request R2 for haptic feedback is output from the list 102, the event managing unit 8 determines that the event E1 is an event accompanied by notification of haptic feedback.

While an example in which a notification request R2 for haptic feedback is output from the list 102 is presented here, no request for notification of haptic feedback is output from the list 102, the window 101, or the like in a case of an event of moving the focus position from the list element (1) to the list element (2) in the list 102, for example. Thus, such an event is determined not to be an event accompanied by notification of haptic feedback.

While the event of moving the focus position from the list element (1) to the list element (2) is presented as an example of an event not accompanied by notification of haptic feedback herein, the event of moving the focus position from the list element (1) to the list element (2) may be an event accompanied by notification of haptic feedback depending on the specification of software or the like.

When the event E1 is determined to be an event accompanied by notification of haptic feedback (step ST4: YES in FIG. 4), the event managing unit 8 stores the event E1 in a queue that is a memory area provided for haptic feedback, to manage the event E1 (step ST5 in FIG. 4).

In the first embodiment, the queue is a first-in first-out (FIFO) queue.

While an example in which the event E1 is determined to be an event accompanied by notification of haptic feedback by the event managing unit 8 is presented herein, if the event E1 is determined not to be an event accompanied by notification of haptic feedback (step ST4: NO in FIG. 4), the event managing unit 8 need not manage the event E1, and thus does not store the event E1 in the queue.

Subsequently, the event managing unit 8 determines whether or not to stop event bubbling for the event E detected by the event detecting unit 7 (step ST6 in FIG. 4).

At this point, the event managing unit 8 has not completed the processing of the event E detected by the event detecting unit 7, and thus determines not to stop event bubbling.

When the event bubbling is determined not to be stopped (step ST6: NO in FIG. 4), the event managing unit 8 performs event bubbling of propagating the events E1 and E2 from the list 102 which is a GUI component identified in the processing in step ST2 to the window 101, which is a parent GUI component of the list 102 (step ST7 in FIG. 4).

Because the event E1 is an event of moving the focus position from the list element (3) to the button 103, processing of the event E1 needs to be performed by the window 101, which is a parent GUI component of the list 102.

In addition, because the event E2 is an event of moving the focus position from the button 103 to the lower end of the window 101, processing of the event E2 needs to be performed by the window 101, which is a parent GUI component of the list 102.

Thus, event bubbling of propagating the events E1 and E2 to window 101 is performed.

When the events E1 and E2 are propagated to the window 101 by event bubbling, the event processing unit 9 first causes the window 101 to perform processing of the event E1 (step ST3 in FIG. 4).

Because the window 101 moves the focus position from the list element (3) in the list 102 to the button 103 by performing processing of the event E1, the window 101 outputs a notification request R1 for haptic feedback to the event managing unit 8 via the event processing unit 9.

On the basis of the presence or absence of a request for notification of haptic feedback from the GUI component, the event managing unit 8 determines whether or not the event E1 included in the event E detected by the event detecting unit 7 is an event accompanied by notification of haptic feedback (step ST4 in FIG. 4).

In the first embodiment, because the notification request R1 for haptic feedback is output from the window 101, the event managing unit 8 determines that the event E1 is an event accompanied by notification of haptic feedback.

When the event E1 is determined to be an event accompanied by notification of haptic feedback (step ST4: YES in FIG. 4), the event managing unit 8 stores the event E1 in the queue to manage the event E1 (step ST5 in FIG. 4).

Subsequently, the event managing unit 8 determines whether or not to stop event bubbling for the event E detected by the event detecting unit 7 (step ST6 in FIG. 4).

At this point, the event managing unit 8 has not completed the processing of the event E detected by the event detecting unit 7, and thus determines not to stop event bubbling.

When the event bubbling is determined not to be stopped (step ST6: NO in FIG. 4), the event managing unit 8 performs event bubbling of propagating the event E2 from the window 101 to a parent GUI component of the window 101 (step ST7 in FIG. 4).

In the first embodiment, however, no parent GUI component of the window 101 is present, event bubbling of propagating the event E2 is not performed.

Subsequently, the event processing unit 9 causes the window 101 to perform processing of the event E2 (step ST3 in FIG. 4).

Because the focus position reaches the lower end that is the end of the window 101 as a result of the processing of the event E2, the window 101 outputs a notification request R3 for haptic feedback to the event managing unit 8 via the event processing unit 9.

On the basis of the presence or absence of a request for notification of haptic feedback from the GUI component, the event managing unit 8 determines whether or not the event E2 included in the event E detected by the event detecting unit 7 is an event accompanied by notification of haptic feedback (step ST4 in FIG. 4).

In the first embodiment, because the notification request R3 for haptic feedback is output from the window 101, the event managing unit 8 determines that the event E2 is an event accompanied by notification of haptic feedback.

When the event E2 is determined to be an event accompanied by notification of haptic feedback (step ST4: YES in FIG. 4), the event managing unit 8 stores the event E2 in the queue to manage the event E2 (step ST5 in FIG. 4).

Subsequently, the event managing unit 8 determines whether or not to stop event bubbling for the event E detected by the event detecting unit 7 (step ST6 in FIG. 4).

At this point, the event managing unit 8 has completed the processing of the event E detected by the event detecting unit 7, and thus determines to stop event bubbling.

When event bubbling is determined to be stopped (step ST6: YES in FIG. 4), the event managing unit 8 performs a process of determining whether or not to permit notification of haptic feedback as a result of an event stored in the queue.

Hereinafter, the process of determining whether or not to permit notification, performed by the event managing unit 8 will be explained in detail.

The event managing unit 8 reads one event from the head of the queue, and sets the read event as an "event F1" (step ST11 in FIG. 5).

Specifically, the event managing unit 8 reads one event that was stored first of one or more events stored in the queue, and sets the read event as an "event F1".

Because the "event F1" corresponds to the event E1 processed by the list 102, the reason for notification of haptic feedback as a result of the "event F1" is that "the focus position has reached the end of the list 102".

Subsequently, the event managing unit 8 determines whether or not the queue is empty (step ST12 in FIG. 5).

If the queue is not empty (step ST12: NO in FIG. 5), the event managing unit 8 reads one event from the head of the queue, and sets the read event as an "event F2" (step ST13 in FIG. 5).

Specifically, the event managing unit 8 reads one event that was stored first of one or more events stored in the queue, and sets the read event as an "event F2".

Because the "event F2" corresponds to the event E1 processed by the window 101, the reason for notification of haptic feedback as a result of the "event F2" is that "the focus position has moved to a different GUI component".

Upon reading the event F1 and the event F2, the event managing unit 8 determines whether or not to permit notification of haptic feedback as a result of each of the managed events F1 and F2 on the basis of the respective reasons for notification of haptic feedback.

Specifically, the event managing unit 8 determines whether or not the reason for notification of haptic feedback as a result of the event F1 is that "the focus position has reached the end of the list 102" (step ST14 in FIG. 5).

In the first embodiment, the reason for notification of haptic feedback as a result of the event F1 is determined to be that "the focus position has reached the end of the list 102".

If the reason for notification of haptic feedback as a result of the event F1 is determined to be that "the focus position has reached the end of the list 102" (step ST14: YES in FIG. 5), the event managing unit 8 does not permit notification of haptic feedback as a result of the event F1.

The event managing unit 8 changes the "event F2" that was read before to an "event F1" (step ST16 in FIG. 5).

Subsequently, the event managing unit 8 determines whether or not the queue is empty (step ST12 in FIG. 5).

If the queue is not empty (step ST12: NO in FIG. 5), the event managing unit 8 reads one event from the head of the queue, and sets the read event as an "event F2" (step ST13 in FIG. 5).

Specifically, the event managing unit 8 reads one event that was stored first of one or more events stored in the queue, and sets the read event as an "event F2".

Because the "event F2" corresponds to the event E2 processed by the window 101, the reason for notification of haptic feedback as a result of the "event F2" is that "the focus position has reached the end of the window 101".

The event managing unit 8 determines whether or not the reason for notification of haptic feedback as a result of the event F1 which was changed in the process of step ST16 is that "the focus position has reached the end of the list 102" (step ST14 in FIG. 5).

In the first embodiment, the reason for notification of haptic feedback as a result of the event F1 is that "the focus position has moved to a different GUI component", and is therefore determined not to be that "the focus position has reached the end of the list 102".

If the reason for notification of haptic feedback as a result of the event F1 is determined not to be that "the focus position has reached the end of the list 102" (step ST14: NO in FIG. 5), the event managing unit 8 permits notification of haptic feedback as a result of the event F1.

When the notification is permitted by the event managing unit 8, the notification instructing unit 10 of the computing device 6 instructs the feedback notifying unit 11 to provide notification of haptic feedback (step ST15 in FIG. 5).

Upon receiving the instruction to provide notification of haptic feedback from the notification instructing unit 10, the feedback notifying unit 11 notifies the operation receiving unit 2 of haptic feedback that stimulates the tactile sense of the user.

This enables the user to recognize that the focus position has moved to a different GUI component.

The event managing unit 8 changes the "event F2" that was read before to an "event F1" (step ST16 in FIG. 5).

Subsequently, the event managing unit 8 determines whether or not the queue is empty (step ST12 in FIG. 5).

In the first embodiment, because three events were already read, the queue is determined to be empty.

When the queue is determined to be empty by the event managing unit 8 (step ST12: YES in FIG. 5), the notification instructing unit 10 instructs the feedback notifying unit 11 to provide notification of haptic feedback (step ST17 in FIG. 5).

Upon receiving the instruction to provide notification of haptic feedback from the notification instructing unit 10, the feedback notifying unit 11 notifies the operation receiving unit 2 of haptic feedback that stimulates the tactile sense of the user.

This enables the user to recognize that the focus position has reached the end of the window 101 and cannot be moved downward.

As is clear from the description above, according to the first embodiment, the event managing unit 8 is provided, which, when an event detected by the event detecting unit 7 is an event accompanied by notification of haptic feedback, determines whether or not to permit notification of haptic feedback on the basis of the reason for notification of haptic feedback as a result of the event detected by the event detecting unit 7, and the feedback notifying unit 11 provides notification of haptic feedback when the determination result from the event managing unit 8 indicates permission of the notification, thereby producing effects of reducing unnecessary notification and preventing notification of haptic feedback that may cause the user to feel something is wrong, without setting priority in advance by the user.

In the first embodiment, an example in which the notification instructing unit 10 instructs the feedback notifying unit 11 to provide notification of haptic feedback when the notification is permitted by the event managing unit 8 is presented.

This is, however, merely an example, and when the event managing unit 8 has output a result of determination on permission of notification to the feedback notifying unit 11 and the determination result from the event managing unit 8 indicates that the notification is permitted, the feedback notifying unit 11 may provide notification of haptic feedback.

Note that the event managing unit 8 may output the result of determination on permission of notification to the feedback notifying unit 11 in any manner.

For example, the event managing unit 8 may output determination results for all the events managed by the event managing unit 8 together to the feedback notifying unit 11. Alternatively, when events with the same reasons for notification of haptic feedback are successive, determination results for the successive events may be output together to the feedback notifying unit 11.

In the first embodiment, an example in which the event managing unit 8 does not permit notification of haptic feedback as a result of an event when the reason for notification of haptic feedback as a result of the event is that "the focus position has reached the end of the list 102" is presented.

This is, however, merely an example, and notification of haptic feedback as a result of an event may be not permitted when the reason for notification of haptic feedback as a result of the event is different from that "the focus position has reached the end of the list 102".

For example, notification of haptic feedback as a result of an event may be not permitted when the reason for notification of haptic feedback as a result of the event is that "the focus position has moved to a different GUI component", for example.

Second Embodiment

In the first embodiment described above, an example in which the event managing unit 8 determines whether or not to permit notification of haptic feedback as a result of each event stored in a queue on the basis of the reason for notification of haptic feedback as a result of the corresponding event is presented.

In a second embodiment, an example in which the event managing unit 8 determines whether or not to permit one notification of haptic feedback on the basis of reasons for notification of haptic feedback as a result of a respective plurality of events stored in the queue will be explained.

Figure 7:
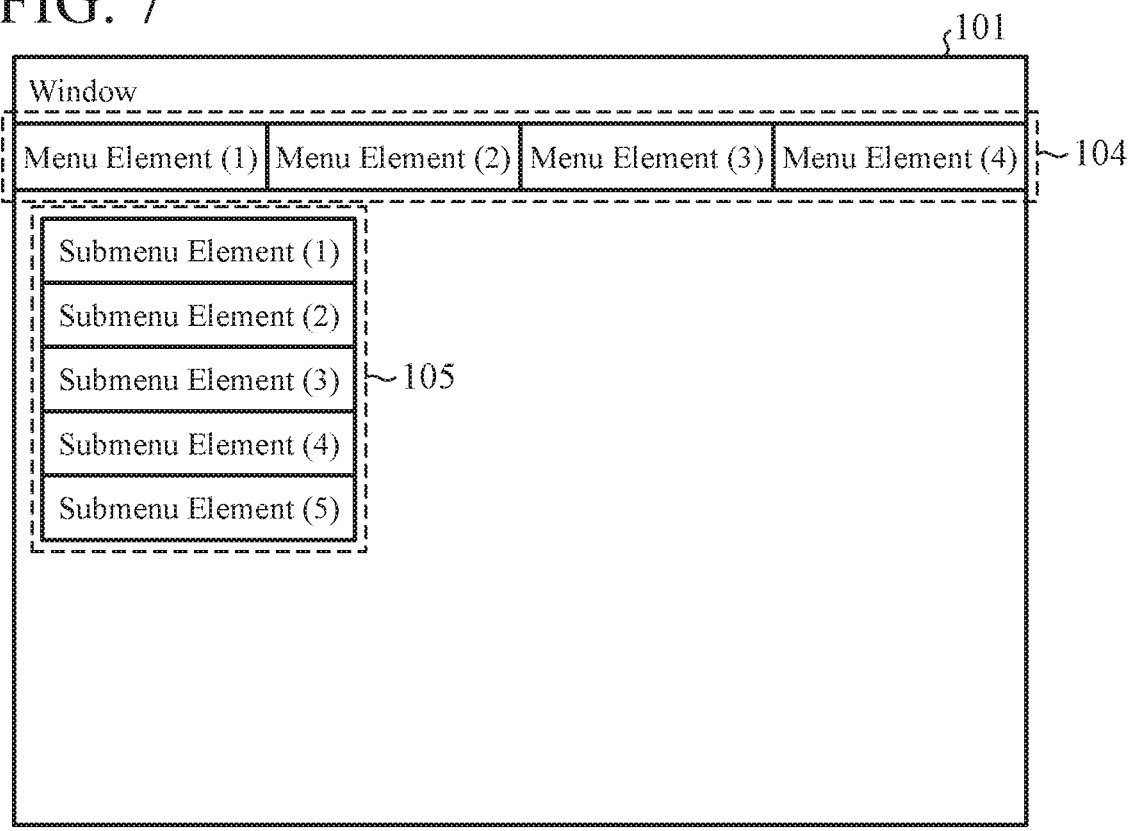
FIG. 7 is an explanatory diagram illustrating an example of GUI components displayed on the screen of the display 1.

FIG. 7 is an explanatory diagram illustrating an example of GUI components displayed on the screen of the display 1.

In the example of FIG. 7, a window 101, which is a GUI component, includes a menu 104 that is a GUI component including menu elements (1) to (4), and a submenu 105 that is a GUI component including submenu elements (1) to (5).

In the example of FIG. 7, the menu element (1) in the menu 104 includes the submenu 105, and the submenu 105 is displayed when an operation of clicking the menu element (1) or an operation of moving the focus position downward is made while focus is placed on the menu element (1) in the menu 104.

The menu elements (2) to (4) in the menu 104 include no submenu 105.

In the example of FIG. 7, when an event of moving the focus position to the submenu 105 is detected while focus is placed on the menu element (1) in the menu 104, the menu 104, which is a GUI component, requests the event managing unit 8 to provide notification of haptic feedback so as to inform the user that the focus position has moved to another GUI component. Hereinafter, this notification request will be referred to as a notification request R4.

In addition, the window 101, which is a GUI component, displays the submenu 105 and requests the event managing unit 8 to provide notification of the haptic feedback. Hereinafter, this notification request will be referred to as a notification request R5.

When a notification request R4 and a notification request R5 are successive, the event managing unit 8 determines that the reasons for notification of haptic feedback correspond to a reason for permitting the notification, and permits one notification of haptic feedback.

When a notification request R4 and a notification request R5 are not successive, the event managing unit 8 determines that the reasons for notification of haptic feedback as results of the respective events do not correspond to a reason for permitting the notification, and does not permit notification of any haptic feedback.

As a result, one notification of haptic feedback is provided only when a notification request R4 and a notification request R5 are successive, which reduces unnecessary notification and prevents notification of haptic feedback that may cause the user to feel something is wrong, without setting priority in advance by the user, in a manner similar to the first embodiment described above.

While an example in which the event managing unit 8 permits one notification of haptic feedback when a notification request R4 and a notification request R5 are successive is presented in the second embodiment, it is not limited thereto, and one notification of haptic feedback may be permitted when a combination of two or more notification requests corresponds to a reason for which notification is permitted.

Third Embodiment

In a third embodiment, an example in which, when the event managing unit 8 has permitted notification of haptic feedback for a reason that focus is placed on an end of a GUI component, and then an operation of placing the focus position on the end of the GUI component is performed, the event managing unit 8 does not permit notification of haptic feedback according to the operation will be explained.

Figure 8:
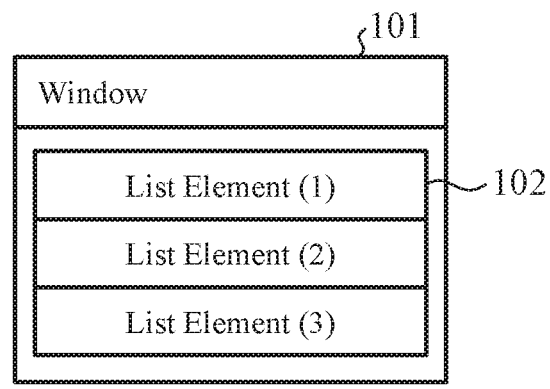
FIG. 8 is an explanatory diagram illustrating an example of GUI components displayed on the screen of the display 1.

FIG. 8 is an explanatory diagram illustrating an example of GUI components displayed on the screen of the display 1.

In the example of FIG. 8, a window 101, which is a GUI component, includes a list 102.

In the third embodiment, for example, when the GUI components as illustrated in FIG. 8 are displayed on the screen of the display 1, the user successively performs a plurality of operations of moving the focus position downward from the position of the list element (3) in the list 102 to the lower end of the list 102, and the plurality of operations are thus received by the operation receiving unit 2.

In this case, when the first operation is performed, the focus position reaches the end of the list 102, and thus a notification request R2 for haptic feedback is output from the list 102 to the event managing unit 8.

Upon receiving the notification request R2 for haptic feedback from the list 102, the event managing unit 8 permits the notification of haptic feedback for the reason that the focus position has reached the end of the list 102 in a manner similar to the first embodiment.

If, however, notifications of haptic feedback for the same reason are permitted successively, the user may feel something is wrong.

Thus, the event managing unit 8 does not permit notification of haptic feedback even when a request for notification of haptic feedback is output from the list 102 as a result of the second or subsequent operation.

Note that the embodiments of the present invention can be freely combined, any component in each of the embodiments can be modified, and any component in each of the embodiments can be omitted within the scope of the invention.

INDUSTRIAL APPLICABILITY

The present invention is suitable for a user interface device that provides notification of haptic feedback.

REFERENCE SIGNS LIST

1: display, 2: operation receiving unit, 3: touch panel, 4: mouse, 5: keyboard, 6: computing device, 7: event detecting unit, 8: event managing unit, 9: event processing unit, 10: notification instructing unit, 11: feedback notifying unit, 21: operation receiving circuit, 22: event detecting circuit, 23: event managing circuit, 24: event processing circuit, 25: notification instructing circuit, 26: haptic feedback device, 31: memory, 32: processor, 101: window, 102: list, 103: button, 104: menu, 105: submenu, 111: node representing window 101, 112: node representing list 102, 113: node representing button 103, 114: node representing list element (1), 115: node representing list element (2), 116: node representing list element (3).

The invention claimed is:
1. A user interface device comprising:
an operation receiving processing circuitry to receive an operation on a screen on which a GUI component being a graphical user interface is displayed;
a processor to execute a program;
a memory to store the program which, when executed by the processor, performs processes of,
detecting, as an event, the operation received by the operation receiving processing circuitry, while propagating the operation from a current GUI component to be operated toward a parent GUI component on a basis of a tree structure of the GUI components; and
when the event detected is an event accompanied by notification of haptic feedback stimulating tactile sense of a user, determining whether or not to permit the notification of haptic feedback, on a basis of a reason for the notification of haptic feedback as a result of the event detected; and
a feedback notifying processing circuitry to provide the notification of haptic feedback when a determination result indicates permission of the notification,
wherein the processes further include,
for one operation received by the operation receiving processing circuitry, each time an event is successively detected from the GUI component to be operated toward the parent GUI component in the tree structure of the GUI components, determining whether or not the detected event is an event accompanied by notification of haptic feedback, and storing the detected event in a first-in first-out queue when the detected event is the event accompanied by notification of haptic feedback, and under a condition where two or more events are stored in the queue, determining whether or not to permit notification of haptic feedback on a basis of reasons for notification of haptic feedback as a result of the respective events, and determining notification of haptic feedback to be finally provided, and
under a condition where two or more events are stored in the queue, reading a first event and a second event from the queue, and determining whether or not to permit notification of haptic feedback as a result of the first event, and then processing the second event as a first event, and repeating the determining process until all the events in the queue have been processed.
2. The user interface device according to claim I, wherein the processes further include determining whether or not to permit one notification of haptic feedback, on a basis of reasons for notification of haptic feedback as a result of a respective plurality of events detected.
3. A user interface device comprising:
an operation receiving processing circuitry to receive an operation on a screen on which a GUI component being a graphical user interface is displayed;
a processor to execute a program;
a memory to store the program which, when executed by the processor, performs processes of,
detecting, as an event, the operation received by the operation receiving processing circuitry, while propagating the operation from a current GUI com- ponent to be operated toward a parent GUI component on a basis of a tree structure of the GUI components; and when the event detected is an event accompanied by notification of haptic feedback stimulating tactile sense of a user, determining whether or not to permit the notification of haptic feedback. on a basis of a reason for the notification of haptic feedback as a result of the event detected; and a feedback notifying processing circuitry to provide the notification of haptic feedback when a determination result indicates permission of the notification, wherein the processes further include, for one operation received by the operation receiving processing circuitry, each time an event is successively detected from the GUI component to be operated toward the parent GUI component in the tree structure of the GUI components, determining whether or not the detected event is an event accompanied by notification of haptic feedback, and storing the detected event in a first-in first-cut queue when the detected event is the event accompanied by notification of haptic feedback. and under a condition where two or more events are stored in the queue, determining whether or not to permit notification of haptic feedback on a basis of reasons for notification of haptic feedback as a result of the respective events, and determining notification of haptic feedback to be finally provided, wherein a plurality of successive operations of placing a focus position on an end of a GUI component are received by the operation receiving processing circuitry, and thereby a plurality of corresponding events are detected, the processes further include, out of the plurality of events detected, permitting notification of haptic feedback as a result of an event detected as a first operation, and not permitting notification of haptic feedback as a result of an event detected as a second or subsequent operation.

* * * * *